United States Patent [19]
Jou et al.

[11] Patent Number: 5,864,559
[45] Date of Patent: Jan. 26, 1999

[54] ISDN MODEM CAPABLE OF SELF-CONFIGURING TO USE ONE OF A VARIETY OF PRE-PROGRAMMED ISDN PROTOCOLS

[75] Inventors: Liangwha Jou, San Jose; William C. Davis, Burlingame; Dean Hamilton, Newark, all of Calif.

[73] Assignee: Ascend Communications, Inc., Alameda, Calif.

[21] Appl. No.: 702,309

[22] Filed: Aug. 23, 1996

[51] Int. Cl.⁶ ..................................................... H04J 3/16
[52] U.S. Cl. .......................... 370/465; 370/250; 370/437; 375/222; 375/231
[58] Field of Search ..................................... 370/250, 351, 370/437, 465, 466, 467; 379/213, 207, 201; 375/222, 231, 319; 395/700

[56] References Cited

U.S. PATENT DOCUMENTS

| | | | |
|---|---|---|---|
| 4,841,561 | 6/1989 | Hill ........................................... | 375/222 |
| 4,953,210 | 8/1990 | McGlynn et al. ........................ | 375/231 |
| 5,517,646 | 5/1996 | Piccirillo et al. ........................ | 395/700 |
| 5,521,965 | 5/1996 | D'Alessio et al. ....................... | 379/213 |
| 5,612,975 | 3/1997 | Becker et al. ............................ | 375/319 |

FOREIGN PATENT DOCUMENTS

0579269 A1 4/1988 European Pat. Off. ........ H04M 11/06

OTHER PUBLICATIONS

Chirayil et al. Modem IC Supports Three 1200 BPS Standards IEEE Transactions on Consumer Electronics vol. CE–31 No. 3 (1985).

Primary Examiner—Douglas W. Olms
Assistant Examiner—Shick Hom
Attorney, Agent, or Firm—Weingarten, Schurgin, Gagnebin & Hayes LLP

[57] ABSTRACT

An ISDN modem is preprogrammed to operate by any one of multiple ISDN protocols, and is provided with a setup program wherein, with the modem connected to an ISDN switch, the multiple protocols are automatically tested one-at-a-time until one is found by which a successful connection to the switch may be made, or until all fail. In the event a successful connection is made, that protocol in use at the time of the successful connection is selected for continued use. In the event that all preprogrammed protocols fail, a user is offered an input mechanism whereby an alternative protocol selection may be entered for trial.

9 Claims, 3 Drawing Sheets

Example of Prior Art

Example of preferred Embodiment

Modem or AU Topologies

ISDN MODEM CAPABLE OF SELF-CONFIGURING TO USE ONE OF A VARIETY OF PRE-PROGRAMMED ISDN PROTOCOLS

BACKGROUND OF THE INVENTION

The incredible success and rapid growth of the Internet has understandably generated a demand for ever-increasing bandwidth in accessing information on the Internet. As a result, ISDN equipment has become very attractive to many people in both offices and homes. Instead of the 28.8 kbits/sec or 33.5 kbits/sec that are usually possible under ideal circumstances, which are rare, an ISDN modem delivers reliably from 56 kbits/sec to 128 kbits/sec, depending on circumstances.

Even though ISDN equipment is popular, the fact remains that configuring ISDN modems can be quite tricky and time consuming, especially for the uninitiated. One of the reasons this is so, is that in addition to the normal set of modem set-up parameters in North America there are a variety of ISDN standards. Because there are a number of standards that may be used it is necessary when configuring an ISDN modem to program the standard used by the local switch of the phone company into the modem or adapter device in order for device to work properly There are three main standards, which are National ISDN, which is more or less the standard ISDN, AT&T ESS5 Custom, and Northern Telecom DMS100 Custom PVC01 or PVC02. The standards pertain in large extent to the data protocol of data packets communicated on the phone line, and the differences in this regard are not critical to the present invention, and are well-known to those with skill in the art, so are not described in detail here. What does happen is that in the various standards the way a phone number is presented in dialing is different. For example, in one standard a number to be dialed may have to be preceded by a pound-sign (#), in another by an asterisk (*), and in another by the letter (N).

Typically a local phone company tries to notify customers and potential customers of the local standard, but due to very large volume and other reasons, the information doesn't always get out to the right people as needed. As a result, there is a lot of guesswork involved for most ordinary folks in configuring an ISDN modem. A typical conventional procedure is presented below.

What is clearly needed is a system that allows a user to plug in a modem and expect it to work (plug-and-play configuration), without having to deal with what type of communication standard the local phone company might be using.

SUMMARY OF THE INVENTION

In a preferred embodiment of the present invention a method is provided for configuring an ISDN modem to operate with an unknown ISDN switch. The method comprises steps of: (a) setting the modem by preprogrammed code to attempt operation with a first protocol of multiple preprogrammed protocols by which the modem may be set to operate; (b) attempting for a first preset time period to connect to the switch by using the first protocol; (c) selecting the first protocol for continued use in the event the connection attempt in (b) is successful; (d) setting the modem to operate by a second of the multiple protocols in the event the first preset time passes without a successful connection; (e) attempting for a second preset time to connect to the switch by using the second protocol; (f) selecting the second protocol for continued use in the event the connection attempt in (e) is successful; (g) continuing to change the protocol and to attempt to connect as in steps (a)–(f) until a successful connection is made and the protocol in use at the time of the successful connection is made is selected for continued use, or until all preprogrammed protocols are tested.

In the event all preprogrammed protocols are tested in the method described immediately above, without a successful connection, the system offers a user an opportunity to enter a protocol for use. The protocols include AT&T ESS Custom, National ISDN, and NT DMS100 in a preferred embodiment.

In one aspect of the invention an ISDN modem capable of operation according to any one of multiple preprogrammed ISDN protocols is provided, comprising: a scheduler for setting the modem to operate according to one after another of the preprogrammed ISDN protocols; a timed tester adapted for attempting to connect to an ISDN Switch by each of the selected protocols for a preset period of time after the modem is set to operate according to each protocol; and a selector adapted for selecting the protocol for continued use that is in use at the time a successful connection is made. In this modem, in the event that all of the list of preprogrammed protocols are tried without a successful connection, the user is offered an input mechanism for selecting an alternative protocol for operation. The protocols include AT&T ESS Custom, National ISDN, and NT DMS100.

In some embodiments modems according to the invention are external modems connected to a computer via a serial port, wherein the modem has a dedicated CPU and memory. In other embodiments the modems are internal modems configured as expansion cards for a computer. In these embodiments the internal modem shares a CPU and memory with the computer.

In some embodiments the modems are Personal Computer Memory Card International Association (PCMCIA) card modems, in which case the modems have each a dedicated CPU and memory, as is the case with external modems described above.

Modems according to embodiments of the invention herein, and equivalents, provide a greatly enhanced setup procedure compared to the procedures of the prior art, whereby a user, whether or not trained and initiated in the details of ISDN protocols and equipment, may easily and successfully install and setup an ISDN modem without knowing the nature of the local phone company's equipment.

DESCRIPTION OF THE PREFERRED EMBODIMENTS

When one purchases an ISDN modem the package includes the modem itself, which may be an external type made to be connected to a computer by a serial port or an internal type made to plug into an expansion port inside the computer, typically via an edge connector. Also included is an instruction manual (User's Manual) and a set of software for configuring and driving the modem. Unless the software is installed on the computer and the proper configuration data is supplied, the modem cannot be expected to operate. Part of the configuration data that has to supplied is the standard ISDN protocol which the local phone company uses, which is a function of the phone company's equipment. It is in the installation and setup procedure for an ISDN modem that conventional difficulties arise that make the present invention valuable.

Figure 1:
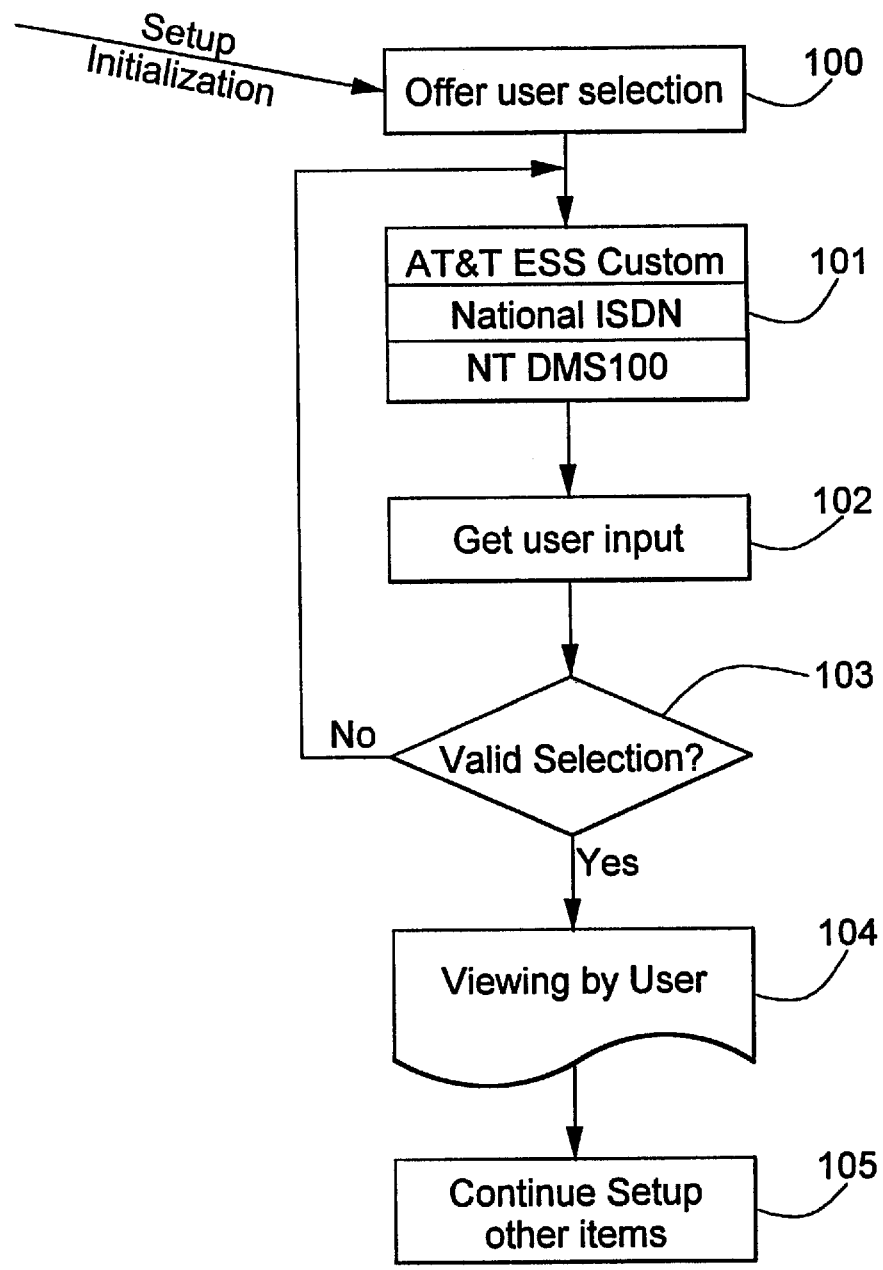
FIG. 1 is a flow diagram depicting a portion of a conventional setup procedure for an ISDN modem.

FIG. 1 is a flow diagram depicting a portion of a conventional setup procedure for an ISDN modem. At step 100 in the conventional procedure the process is at the point that the ISDN standard used by the phone company needs to be set. In conventional technology this is a manual procedure. Typically the user is offered at step 101 a selection of the standard IDN protocols. The user then selects at step 102 one of the choices, or enters supposedly pertinent data in a data field presented by the setup system on the user's display monitor. At step 103 the system determines if the user's input is a valid input. If not, control returns to step 101 and the user has an opportunity to alter the input.

After a valid input is made, the user is allowed to review the selection at step 104. The user the continues from step 105 to set up other items until setup is complete. When setup is complete the user may try to use the modem. If the ISDN protocol input was correct the modem should operate. If not, the user must terminate the whole procedure and start the setup procedure all over again, selecting (hopefully) one of the other options for ISDN protocol standard.

As it is necessary to complete the entire process before determining if the protocol standard was correct, the conventional process can be a long, frustrating, and time consuming procedure.

Figure 2:
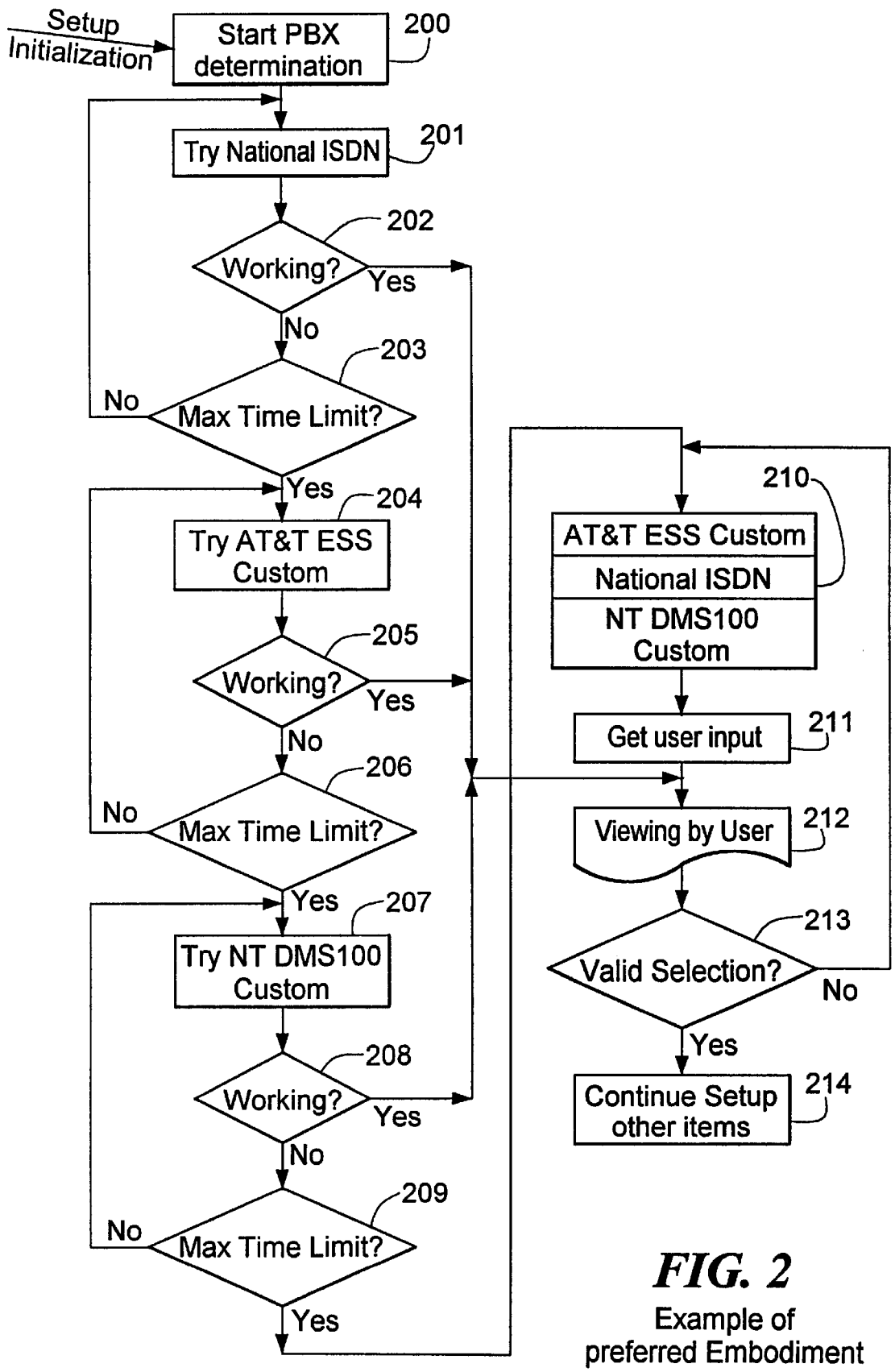
FIG. 2 is a flow diagram depicting a portion of a method for setting up an ISDN modem in an embodiment of the present invention.

FIG. 2 is a flow diagram depicting a portion of a method for setting up an ISDN modem in an embodiment of the present invention. At step 200 the process arrives at the point that the standard protocol is to be determined and entered. At step 201 the system in this embodiment of the invention automatically selects National ISDN standard. This is perhaps the most often used type. The order of the different types tested, however, and the number of the different types tested is exemplary, and may vary without departing from the spirit and scope of the invention.

At step 202 the system determines automatically if the selection was correct. The determination is made by trial. If the modem operates properly the selection was correct, and control passes directly to step 212. If at step 202 the modem is not working control goes to step 203, where a timer function is started the first time through. If the time limit for the test has not been reached, control goes back to step 201 and the system continues to try to connect with the local phone equipment by the first protocol, in this case National ISDN. When and if success is achieved, control passes directly to step 212. If the timer function at step 203 times out without a proper connection being made using National ISDN, control passes step 204, and the system attempts to connect the modem to the local phone equipment using AT&T ESS Custom.

Again, as in the first trial, the system checks for a connection being made at step 205. If a connection is made using AT&T ESS Custom, as checked at step 205, control passes directly to step 212. IF at step 205 a connection is not made, a timer function is started at step 206, and the system continues to try with the AT&T standard protocol until either success is achieved or the timer times out. If the timer times out without success being achieved, control passes on to step 207 and NT DMS 100 Custom is tried. At step 208 the system checks for a successful connection, and when and if a connection is achieved control passes directly to step 212. If a successful connection is not achieved at step 208, a timer function is started at step 209, and, as long as a connection is not made, control keeps looping back to step 207 until either a successful connection is made or until the timer function at step 209 times out.

In the example shown there are three different protocols shown to be tried. It will be apparent to those with skill in the art that there could be more or fewer, and the order of trial could be different as well, without departing from the spirit and scope of the invention. In addition, the time limits in steps 203, 206, and 209 are, in this example, on the order of a few seconds, 5 to 15 seconds for example. It will be apparent to those with skill in the art that these times can vary considerably, and that not all of the time limits need to be the same.

If any one of the automatic trials is successful, control eventually arrives at step 212, and the results are then presented to the user at step 213 for approval. If the user approves, control goes to step 214, and setup continues in the conventional manner. After setup is finished, then, the user can expect the modem to operate properly. If the user does not approve, control passes to step 210. If all the automatic set-ups fail the process also arrives at step 210, and the user is then offered manual selection as in the prior art and described relative to FIG. 1. Step 210, where manual selection is offered, is only reached if the automatic set-up steps fail, or if the user vetoes the selection the system has made to arrive at step 212.

Figure 3:
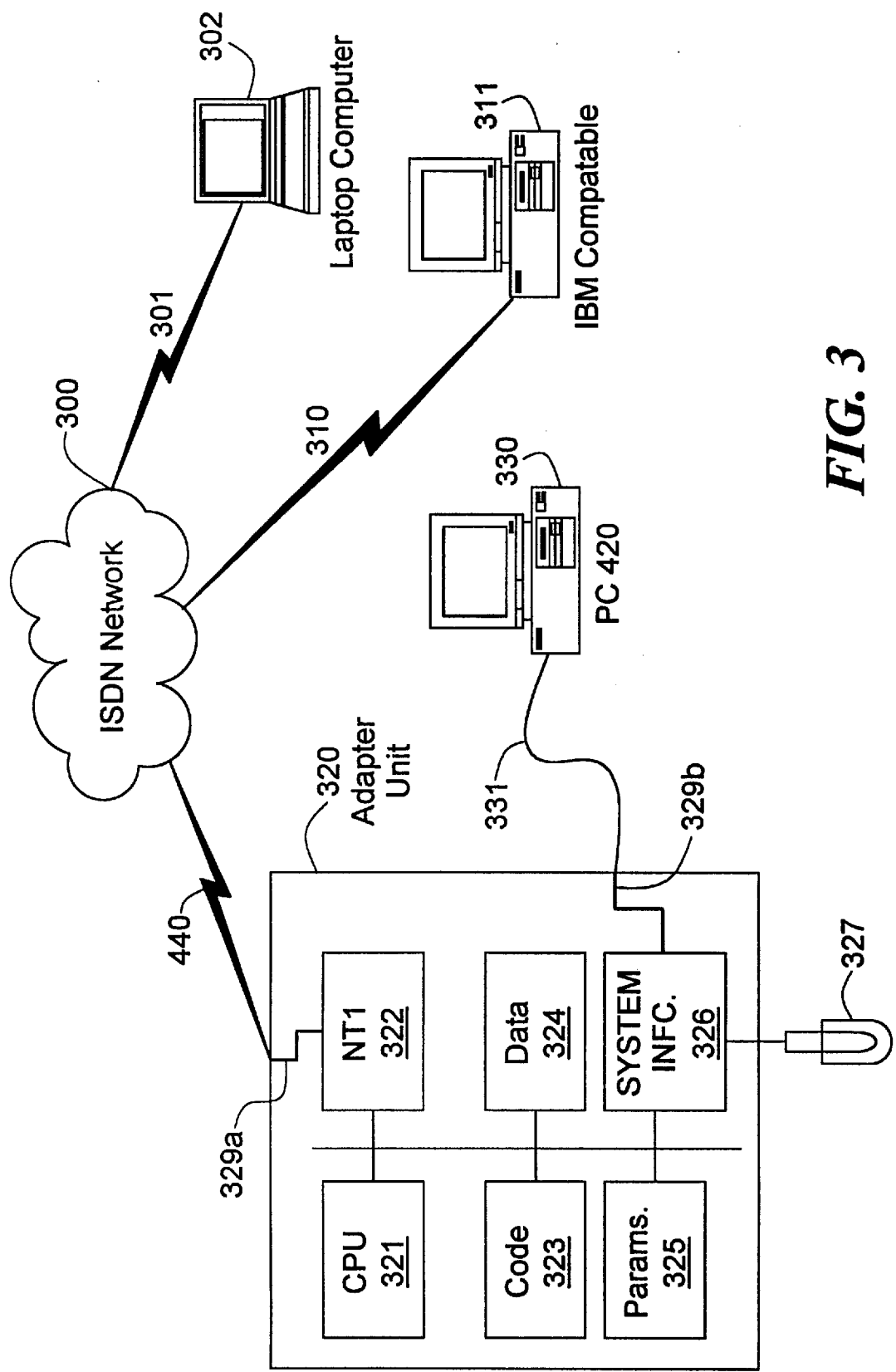
FIG. 3 is a diagram of modem and adapter unit (AU) topologies in embodiments of the present invention.

FIG. 3 is a diagram of modem and adapter unit (AU) topologies in embodiments of the present invention. FIG. 3 shows three exemplary computers: a laptop computer 302, an IBM-compatible computer 311 and a third personal computer (PC) 330, which may or may not be IBM compatible. PC 330 is connected to ISDN network 300 by an external ISDN adapter unit 320. AU 320 is connected to PC 330 by a serial link 331 by serial interface port 329b of AU 320. Connection to ISDN network 300 is by ISDN link 440 connected at ISDN interface port 329a.

Internal to AU 320 there are network interface circuitry 322, typically termed NT1, for Network Terminator Type 1, system interface 326 with a serial port and indicator lights represented by lamp 327, a CPU 321, storage 323 for operating code, data storage 324, and Parameter storage 325. The CPU and memory are necessary for the stand-alone modem.

Although not explicitly shown in FIG. 3, PC 311 is connected to ISDN network 300 via link 310 through an internal ISDN adapter without dedicated CPU or memory. In the internal configuration, the modem shares the PC CPU and memory, and is thus generally less expensive than the external modem. Laptop Computer 302 uses a PCMCIA (Personal Computer Memory Card International Association) plug-in card (now generally termed a PC card) that has the same architecture as AU 320 and is connected via link 301 to the ISDN network.

It will be apparent to those with skill in the art that there are many alterations that might be made in the embodiments of the invention described without departing from the spirit and scope of the invention. For example,, as has been described above, the specific protocols to be tried and the order in which they are tried in embodiments of the invention may vary widely. Also, the manner in which control code is written to accomplish the functions described may vary among individual programmers, because it is well-known in the art that individual programmers have individual preferences in programming. There are similarly many alternatives in the manner in which specific circuitry may be provided in embodiments of the invention. Other options will occur to those with skill in the art given the examples described above, while remaining within the scope of the invention. The invention is limited only by the scope of the claims which follow.

What is claimed is:

1. In configuring an ISDN modem to operate with an unknown ISDN switch, a method for identifying the switch type and setting the modem to operate with an ISDN protocol compatible with the switch, comprising the steps of:

(a) setting the modem by preprogrammed code to attempt operation with a first ISDN protocol of multiple preprogrammed ISDN protocols by which the modem may be set to operate;

(b) attempting for a first preset time period to connect to the switch by using the first ISDN protocol;

(c) selecting the first ISDN protocol for continued use in the event the connection attempt in (b) is successful;

(d) setting the modem to operate by a second of the multiple ISDN protocols in the event the first preset time passes without a successful connection;

(e) attempting for a second preset time period to connect to the switch by using the second ISDN protocol;

(f) selecting the second ISDN protocol for continued use in the event the connection attempt in (e) is successful; and (g) continuing to change the protocol to others of the ISDN protocols and to attempt to connect as in steps (a)–(f) until a successful connection is made and the protocol in use at the time of the successful connection is made is selected for continued use, or until all preprogrammed protocols are tested.

2. The method of claim 1 wherein, in the event all preprogrammed protocols are tested without a successful connection, the system offers a user an opportunity to enter a protocol for use.

3. The method of claim 1 wherein the protocols include AT&T ESS Custom, National ISDN, and NT DMS 100.

4. An ISDN modem capable of operation according to any one of multiple preprogrammed ISDN protocols, comprising:

a scheduler for setting the modem to operate according to one after another of the preprogrammed ISDN protocols;

a timed tester adapted for attempting to connect to an ISDN switch by each of the selected protocols for a preset period of time after the modem is set to operate according to each protocol; and a selector adapted for selecting the protocol for continued use that is in use at the time a successful connection is made.

5. The ISDN modem of claim 4 wherein, in the event that all of the list of preprogrammed protocols are tried without a successful connection, the user is offered an input mechanism for selecting an alternative protocol for operation.

6. The ISDN modem of claim 4 wherein the protocols include AT&T ESS Custom, National ISDN, and NT DMS 100.

7. The ISDN modem of claim 4 wherein the ISDN modem is an external modem connected to a computer via a serial port, and wherein the modem has a dedicated CPU and memory.

8. The ISDN modem of claim 4 wherein the modem is an internal modem configured as an expansion card for the computer, and wherein the internal modem shares a CPU and memory with the computer.

9. The ISDN modem of claim 4 wherein the ISDN modem is implemented as a Personal Computer Memory Card International Association (PCMCIA) card, and wherein the modem has a dedicated CPU and memory.

* * * * *